US 12,232,922 B2

(12) United States Patent
Korten et al.

(10) Patent No.: US 12,232,922 B2
(45) Date of Patent: Feb. 25, 2025

(54) METHOD OF BUILDING UP A PHYSICAL OBJECT BY ADDITIVE MANUFACTURING

(71) Applicant: Solventum Intellectual Properties Company, Maplewood, MN (US)

(72) Inventors: Malte Korten, Moorenweis (DE); Bastian P. Kirchner, Fürstenfeldbruck (DE); Daniel D. Oberpertinger, Herrsching (DE); Andreas Herrmann, Munich (DE); Gioacchino Raia, Türkenfeld (DE); Anja Friedrich, Munich (DE)

(73) Assignee: Solventum Intellectual Properties Company, Maplewood, MN (US)

( * ) Notice: Subject to any disclaimer, the term of this patent is extended or adjusted under 35 U.S.C. 154(b) by 959 days.

(21) Appl. No.: 17/250,132

(22) PCT Filed: Jun. 10, 2019

(86) PCT No.: PCT/IB2019/054831
§ 371 (c)(1),
(2) Date: Dec. 4, 2020

(87) PCT Pub. No.: WO2019/239296
PCT Pub. Date: Dec. 19, 2019

(65) Prior Publication Data
US 2021/0228316 A1    Jul. 29, 2021

(30) Foreign Application Priority Data
Jun. 15, 2018  (EP) ..................................... 18177895

(51) Int. Cl.
*A61C 5/77*        (2017.01)
*A61C 13/00*       (2006.01)
(Continued)

(52) U.S. Cl.
CPC ............ *A61C 5/77* (2017.02); *A61C 13/0013* (2013.01); *B29C 64/129* (2017.08);
(Continued)

(58) Field of Classification Search
CPC ... A61C 5/77; A61C 13/0013; A61C 13/0019; B33Y 10/00; B33Y 80/00; B29C 64/40
See application file for complete search history.

(56) References Cited

U.S. PATENT DOCUMENTS 6,322,728 B1 * 11/2001 Brodkin ................. A61K 6/838
264/603
8,046,097 B2   10/2011 Hull
(Continued)

FOREIGN PATENT DOCUMENTS

CN        103946008        7/2014
CN        105682899        6/2016
(Continued)

OTHER PUBLICATIONS

International Search Report for PCT International Application No. PCT/IB2019/054831, mailed on Oct. 7, 2019, 5 pages.

*Primary Examiner* — Nicholas D Lucchesi

(57) ABSTRACT

A method of building up a physical object by additive manufacturing which has the steps of building up the object and at least one support structure layer by layer along a build axis. The support structure supports the object relative to a build platform. During building up the object and the at least one support structure a connection is provided between the support structure and the object by a plurality of layers each of which being a common layer of the object and the support structure.

16 Claims, 4 Drawing Sheets

(51) Int. Cl.
  *B29C 64/129*      (2017.01)
  *B29C 64/264*      (2017.01)
  *B29C 64/40*       (2017.01)
  *B33Y 10/00*       (2015.01)
  *B33Y 80/00*       (2015.01)
  *B29L 31/00*       (2006.01)

(52) U.S. Cl.
  CPC ............ *B29C 64/264* (2017.08); *B29C 64/40* (2017.08); *B33Y 10/00* (2014.12); *B33Y 80/00* (2014.12); *A61C 13/0019* (2013.01); *B29L 2031/7536* (2013.01)

(56) References Cited

U.S. PATENT DOCUMENTS

| | | | |
|---|---|---|---|
| 9,183,325 B2 | 11/2015 | Wighton | |
| 11,202,694 B2* | 12/2021 | Korten | A61C 13/0019 |
| 2002/0064745 A1* | 5/2002 | Schulman | B29C 64/153 |
| | | | 264/16 |
| 2008/0280246 A1* | 11/2008 | Wen | H04N 21/4788 |
| | | | 348/E7.084 |
| 2009/0025638 A1* | 1/2009 | Inoue | A61C 13/0013 |
| | | | 118/712 |
| 2010/0203478 A1* | 8/2010 | Rubbert | A61B 6/14 |
| | | | 700/98 |
| 2010/0310786 A1* | 12/2010 | Dunne | A61C 13/0018 |
| | | | 427/595 |
| 2012/0261848 A1* | 10/2012 | Haraszati | B33Y 80/00 |
| | | | 264/17 |
| 2012/0329008 A1* | 12/2012 | Fishman | B33Y 50/00 |
| | | | 433/172 |
| 2016/0302884 A1 | 10/2016 | Paehl et al. | |
| 2017/0209245 A1* | 7/2017 | Yang | A61C 19/003 |
| 2017/0232683 A1 | 8/2017 | Alcantara Marte et al. | |
| 2019/0060035 A1* | 2/2019 | Schaufelberger | A61C 8/0018 |
| 2021/0386519 A1* | 12/2021 | Herrmann | A61C 5/73 |

FOREIGN PATENT DOCUMENTS

| | | |
|---|---|---|
| CN | 105792770 | 7/2016 |
| CN | 107052335 | 8/2017 |
| JP | 05301293 A | 11/1993 |
| JP | 2009190291 A | 8/2009 |
| WO | WO 2015-019070 | 2/2015 |
| WO | WO 2018-104885 | 6/2018 |

* cited by examiner

METHOD OF BUILDING UP A PHYSICAL OBJECT BY ADDITIVE MANUFACTURING

CROSS REFERENCE TO RELATED APPLICATIONS

This application is a national stage filing under 35 U.S.C. 371 of PCT/IB2019/054831, filed Jun. 10, 2019, which claims the benefit of European Application No. 18177895.2, filed Jun. 15, 2018, the disclosure of which is incorporated by reference in its/their entirety herein.

FIELD OF THE INVENTION

The invention relates to a method of building up a physical object by additive manufacturing, and in particular to such a method in which a connection between a support structure and the object is formed by a plurality of layers each of which being a common layer of the object and the support structure.

BACKGROUND ART

In a variety of technical fields physical objects or mechanical workpieces are more and more manufactured by additive manufacturing processes.

Such additive manufacturing processes typically allow for building up an object in its desired individual shape, by subsequently adding material to create that shape. So-called subtractive processes in which an object is machined from an oversized blank by removal of material are more and more replaced by additive manufacturing processes.

While additive manufacturing processes are meanwhile widely used in the industry for rapid prototyping, the manufacturing of final products in many areas is still challenging. In particular for making dental restorations it is generally required to use materials that are compatible for use in a human body. Further, a dental restoration manufactured by a build-up process must fulfill requirements to mechanical stability as well as expectations about aesthetics, for example concerning color shading and translucency.

Some additive manufacturing processes are based on stereolithography. Stereolithography generally uses light for hardening light hardenable or photopolymerizable resins. Data based on computer aided design and/or computer aided manufacturing (CAD/CAM) are used to project a light pattern on a layer of light hardenable resin. The photosensitive resin typically solidifies in consequence of the exposure of the light so that a layer of solidified resin according to the pattern is formed. A desired three-dimensional object is created by consecutively adding layers. Thereby the pattern is controlled according to the desired outer shape of the three-dimensional object.

The layerwise manufacturing methods typically require each layer to be supported on a build platform on which the physical object is built up. For any new layer naturally a previously build layer can provide support. However, in case any new layer extends with one or more portions beyond any previously build layer such portions cannot be supported by previously built layers. Accordingly, such portions overhang previously built layers. It is common to support overhanging portions by support structures that are removed after the object has been built up. Typically, the support structures are rod-shaped and built up in the process of building up the object. An overhanging portion of a layer thus is created directly onto the support structure. This means that the previously build layer of an overhanging portion is a layer of the support structure.

WO 2018/104885 A1 (DWS) describes a stereolithography machine comprising a container for a fluid substance, at least one radiation source, an optical group configured to direct the radiation towards a reference surface, and a control unit for controlling the optical group.

U.S. Pat. No. 9,183,325 B2 (Wighton et al.) describes a method of generating a support structure for an object, the support structure and the object to be fabricated via one or more additive fabrication techniques, comprising identifying one or more regions of the object to which mechanical support is to be provided, identifying one or more support points and generating the support structure for the object.

WO 2015/019070 A1 (Renishaw) describes an additive manufacturing method comprising building an object layer-by-layer, wherein a plurality of supports is provided for supporting the object during the build.

Although existing approaches for building up objects provide certain advantages there is still a need for a method that minimizes adverse effects resulting from the use of support structures during building up the objects.

SUMMARY OF THE INVENTION

The invention is related to a method of building up a physical object by additive manufacturing. The method comprises the steps of:
building up the object and at least one support structure layer by layer along a build axis, wherein the support structure supports the object directly or indirectly relative to a build platform, and during building up the object and the at least one support structure
providing a connection between the support structure and the object by a plurality of layers each of which being a common layer of the object and the support structure.

According to the invention, the support structure is directly connected to the object to be produced by one or more common layers. This is advantageous because the predetermined breaking surface is moved from the bottom of the object to a different region of the object, e.g. to the inner side of a dental coping, which is typically less sensitive.

This is in contrast e.g. to the process described in U.S. Pat. No. 9,183,325 B2 (Wighton et al.) where a support structure is wholly built before the building of the actual workpiece starts and connected in perpendicular direction to the workpiece surface.

According to one embodiment, during the building up the object and the at least one support structure only support structures are built, which have a connection between the support structure and the object by a plurality of layers each of which being a common layer of the object and the support structure. That is, according to this embodiment no support structures are built before the building of the object starts.

Preferably each layer of the support structure that connects to the object forms a common layer of the object and the support structure.

The invention may be advantageous in that it maximizes flexibility in positioning support structures to objects that are manufactured by additive manufacturing. In particular the invention allows the connection of support structures from a direction laterally of the build axis. In addition the invention is advantageous in that it facilitates the removal of the support structures from the object after finishing the object although the support structures are configured to appropriately support the object during the manufacturing. It has been further found that in the additive manufacturing of dental restorations, in particular dental copings (like crowns or partial crowns), the invention enables the use of support structures without affecting any surfaces of the dental restorations by residues (for example fraction surfaces) of the support structures.

The term "additive manufacturing" particularly refers to a process in which a physical object is built up in layers (or layerwise). Typically the layers have a particular thickness in the build axis. The build axis typically extends in a dimension along which the layers are stacked onto each other. In dimensions perpendicular to the build axis each layer typically has a shape that is derived from an overall three-dimensional shape of the object. Typically the layers are obtained from virtually slicing a three-dimensional computer model of the object into a multiplicity of virtual layers. The virtual layers are then used to build up physical layers that correspond to the virtual layers in thickness and shape. Useful additive manufacturing processes comprise for example Digital Light Processing (DLP) or stereolithography. Further, for the purpose of the present specification the term "additive manufacturing" is understood to mean "3D printing".

In one embodiment the method comprises the steps of building up the object and a plurality of support structures layer by layer along the build axis, and during building up the object and the support structures, providing a connection between each support structure and the object by a plurality of layers each of which being a common layer of the object and the support structure.

Each support structure preferably supports the object directly or indirectly relative to the build platform. In case the support structures support the object indirectly relative to the build platform, a baseplate may be arranged directly on the build platform and the support structures may extend from the baseplate to the object. In case the support structures support the object directly relative to the build platform, the support structures may extend from the build platform to the object.

The object is typically supported by the support structures only and not additionally connected to the build platform.

In an embodiment a separation plane is defined adjacent a transition between the support structure and the object. The separation plane virtual and defined by a planar structure of the transition. The structure of the transition may for example be formed by a constriction between the support structure and the object. The constriction may extend along a planar path having a rectangular shape, a polygonal shape, an oval shape or any other circumferential shape. Accordingly the separation plane may have a rectangular, polygonal, oval or other appropriate outline or shape. The separation plane preferably has a vertical size in a dimension of the build axis and a horizontal size in a dimension perpendicular of the build axis. The vertical size is preferably greater than the horizontal size.

In an embodiment the support structure connects to the object from a direction laterally of the build axis. This means that the support structure is connected to the object at a surface of the object that faces in a direction that is perpendicular or otherwise inclined to the build axis.

In an embodiment the support structure forms the constriction. The cross-section of the constriction defines the separation plane. Preferably the constriction forms the smallest cross-section of the support structure. The constriction thus preferably forms a predetermined break zone.

In an embodiment the support structure comprises a base structure and a connecting structure. The connecting structure connects the base structure and the object. Preferably the constriction is formed by the connecting structure.

In an embodiment the base structure extends parallel or essentially parallel to the build axis. Further the connecting structure preferably extends perpendicular or essentially perpendicular to the build axis.

In an embodiment the step of building up the object and the support structure (or the plurality of support structures) is based on successively performing the steps of:
providing a layer of a light hardenable material; and
exposing at least a portion of the layer with light appropriate to cause the light hardenable material to harden.

The wording "light appropriate to cause the light hardenable material to harden" preferably refers to light within the wavelength of between 450 nm to 495 nm (blue light) or light within the wavelength of between 330 nm and 450 nm, preferably 383 nm (UV-light). The light used for the method of the invention can be selected in accordance to the light hardenable material used for building up the object.

In an embodiment the step of building up the object and the support structure is based on stereolithography (e.g. Digital Light Processing™ (DLP)) or vat polymerization. The method may accordingly comprise the step of providing a device that is based on DLP. The device may have a light transmissible (preferably transparent) exposure plate for receiving light hardenable material, a build platform on which the object and the support structures are built up, and a light projector for projecting a light pattern through the exposure plate toward the build platform. The exposure plate and the build platform are preferably movable relative to each other in a positional controlled manner. The position of the exposure plate and the build platform relative to each other, as well as the light pattern are preferably controlled by a computer, based on a computer model of the object. The exposure plate may be part of a vat in which some light hardenable material may be provided. Further the vat may be provided in addition to the exposure plate.

In a preferred embodiment the object is a dental restoration, in particular a dental coping. The dental coping preferably has an occlusal end and a margin end. Preferably a cavity extends into the dental coping from the margin end. The cavity forms (or is delimited by) an inner surface of the dental coping. The dental coping further preferably has an outer surface. The outer surface is preferably shaped to resemble the shape of a natural tooth. Typically the outer surface of the dental coping is that surface that is visible, when the dental coping is installed in a patient's mouth.

In an embodiment the support structure extends from outside the cavity into the cavity and connects to the dental coping at the inner surface. Preferably during building up the dental coping the margin end faces the build platform and the occlusal end faces the exposure plate. Preferably the support structure extends from outside the cavity into the cavity and connects to the dental coping at the inner surface only. That is, no support structure connects to the dental coping at the outer surface.

By following this approach, the risk that the outer surface of the dental restoration or coping which remains visible after fixation to a tooth stump is damaged when the support structure is removed is reduced.

In one embodiment the method comprises the step of providing the connection between the support structure and the object with a void that is filled with light hardenable material. Such a void may be created by providing a layer of hardenable material and hardening a layer that has a circumferential portion that surrounds a portion of (non-harden) hardenable material. Preferably the circumferential portion is shaped such that the surrounded portion of hardenable material is so narrow that the hardenable material is retained within the circumferential portion by capillary action. In particular upon lifting the hardened layer from the exposure plate or vat the hardenable material is retained within the surrounded portion by capillary action. A so formed filled surrounded portion may be encapsulated between two layers of hardened material so that a void filled with hardenable material can be created.

In one embodiment the method comprises the step of providing the connection between the support structure and the object with a plurality of voids that are filled with light hardenable material. The plurality of voids may be arranged across the predetermined breaking zone. For example each common layer of the connection between the object and the support structure may comprise a plurality of voids filled with light hardenable material arranged in a row. The adjacent common layer of the connection between the object and the support structure may comprise a plurality of further voids filled with light hardenable material arranged in a row, but offset to the voids of the previous layer. Thus, the transition between the support structure and the object can be provided with at least one or a plurality of voids filled with light hardenable material arranged, for example, in a checkerboard pattern.

Therefore, the transition between the support structure and the object can be controlled in its breaking resistance. For example a higher amount of voids causes the breaking resistance to decrease because the cross-section of hardened material is reduced. Thus breaking away of the support structures is facilitated. Further after breaking the support structure off from the object the voids are opened and light hardenable material is released. It has been found that the released light hardenable material distributes on the fraction surface and may thus be used to gloss over the fraction surface after hardening.

The invention further relates to a physical object made of a plurality of stacked and cohering layers. In particular the physical object may be made by additive manufacturing. A build axis is defined in a dimension along which the layers are stacked. The object exhibits one or more fraction surfaces that extend across a plurality of layers. In particular, the fraction surface extends entirely across each of the plurality of layers. The fraction surfaces result from support structures broken away from the physical object. Further, the support structures were used to support the object relative to a build platform during the object was built up.

In an embodiment the physical object is the form of a dental restoration, in particular in the form of a dental coping. The dental coping has an occlusal end and a margin end. Further, a cavity extends into the coping from the margin end. The cavity forms (or is delimited by) an inner surface of the coping. The fracture surface is formed within the inner surface.

In a further embodiment the physical object is obtained or obtainable by the method of the invention. Accordingly any structure described in the context of the method of the invention may form a structure of the physical object. Further, any structure resulting from the method of the invention may form a structure of the physical object.

Disclosed is further a software tool and a method for computer aided positioning of one or more support structures. The software tool is preferably configured to perform the method for computer aided positioning of one or more support structures. The method may comprise the step of determining a breaking resistance. The breaking resistance is preferably a strength of the connecting structure at the transition to the object. The breaking resistance can for example be calculated from the cross-section of the constriction of the connecting structure based on the light hardened material the support structure is made of.

The method may further comprise the step of identifying a so-called protected surface on the object. A protected surface in that regard is a surface that shall be free of any support structure. The protected surface may for example be selected and determined on a CAD system via a mouse pointer. For example a user may identify an area by defining several points which the CAD system connects by a spline. The method may comprise the step of highlighting any selected protected surface for display by the CAD system.

Further the method may comprise the step of automatically placing a support structure on the object. For example the several support structures may be distributed at a predetermined distance from each other.

DETAILED DESCRIPTION OF THE INVENTION

Figure 1:
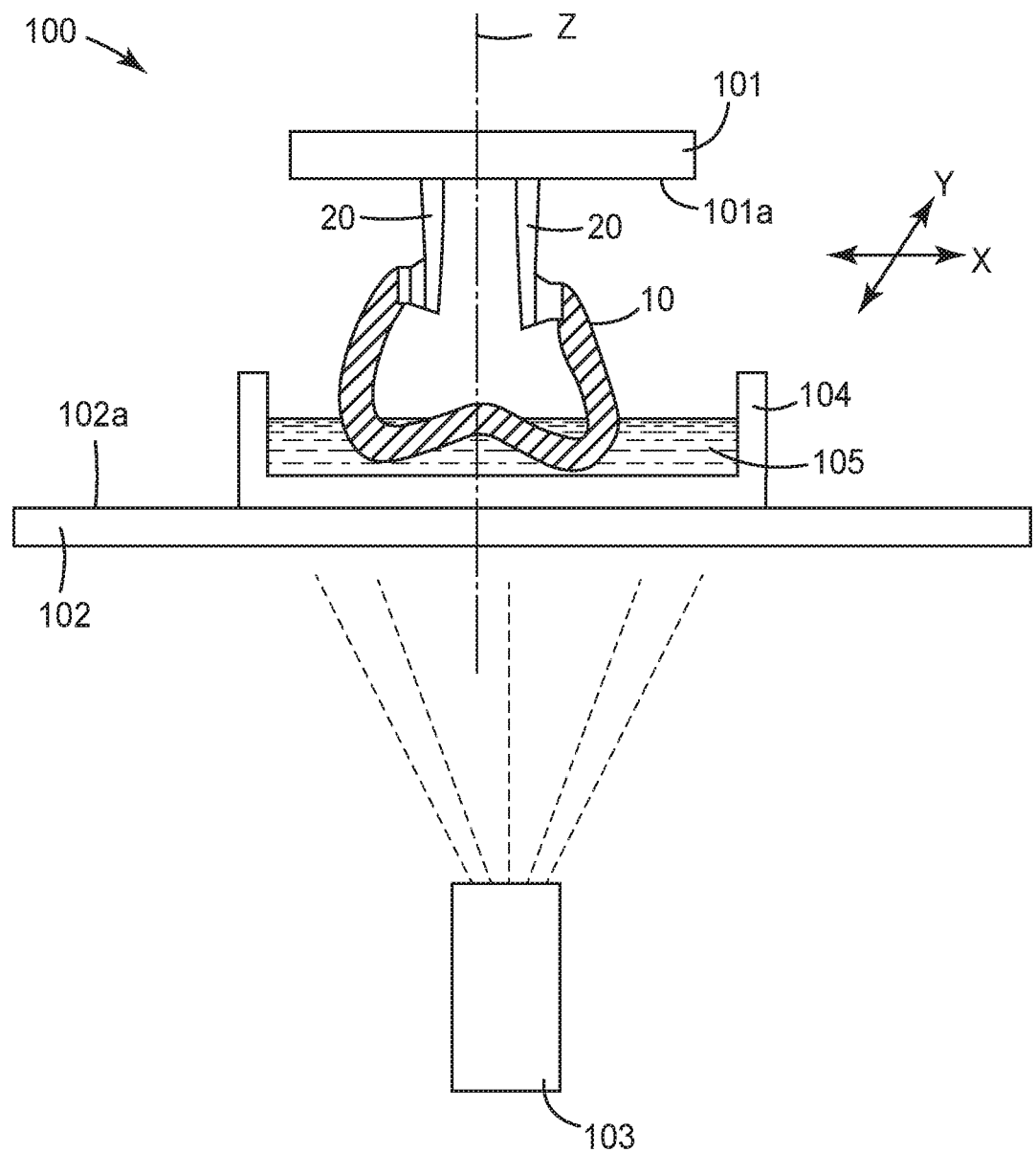
FIG. 1 is a cross-sectional view of a device for performing the method according to the invention.

FIG. 1 illustrates an exemplary device 100 for building up a physical object 10 by additive manufacturing. The device 100 may be used for performing the method of the invention. The device 100 shown is based on the so-called Digital Light Processing (DLP) technique. This technique uses a back-illuminatable exposure plate 102 on which a light hardenable material 105 can be provided, and a build platform 101 that plunges into the light hardenable material 105 and which is movable relative to the exposure plate 102. The method of the invention is not limited to a device using DLP, but may be likewise used with other additive manufacturing devices, as appropriate. In particular other stereolithography devices may be used with the present invention.

The device 100 shown is configured for building up the physical object 10 in layers of a light hardened material. Each layer is generated in that a gap between the exposure plate 102 and the build platform 101 is provided and liquid hardenable material is provided to fill that gap. Portions of the light hardenable material 105 within that gap are subsequently hardened by exposing these portions to light. The light hardenable material within the gap is particularly irradiated by a two-dimensional light pattern so that those portions of the light hardenable material that are exposed to light in combination form a layer of hardened material shaped in accordance to that pattern.

To create the light pattern the device 100 has a light source 103 which in this example comprises a digital light projector. Further the exposure plate 102 is transparent so that light emitted from the light source passes through the exposure plate 102 and reaches the hardenable material. The exposure plate 102 exhibits an essentially planar exposure surface 102a. The exposure surface 102a is oriented upwards, meaning faces away from the center of gravity.

The light source 103 is arranged underneath the exposure plate 102. In particular, seen from the build platform 101, the digital light projector is arranged behind the exposure plate 102 for projecting light through the exposure plate 102 toward the build platform 101. The digital light projector is configured for projecting light at a two-dimensional pattern. The light pattern may be based on a matrix of a multiplicity of pixels arranged in a regular pattern, for example like a checkerboard. The digital light projector is configured such that each pixel of the pattern can be illuminated or left dark. The resolution of the light pattern adjacent the exposure surface 102a determines the accuracy at which the object can be built up in dimensions parallel to the exposure surface 102a. These dimensions correspond to a first horizontal dimension X and a second horizontal dimension Y that are arranged perpendicular to each other and that are parallel to the exposure surface 102a. (In the Figure the second horizontal dimension Y is indicated in a perspective view for illustrative purposes only, although the second horizontal dimension Y is actually arranged perpendicular to the plane of the Figure.) The control of the light pattern may be provided by a so-called Digital Micro-mirror Device (DMD). The DMD comprises a multiplicity of individually rotatable small mirrors which can be oriented for deflecting light from a light beam toward the exposure plate to generate a light pixel or away from the exposure plate to generate a dark pixel. The skilled person will recognize other techniques for light projection. For example, the projector may be based on the LCD (Liquid Crystal Display) projection technique. The light pattern may further be based on a movable light beam, for example a laser beam. In this technique the pattern may or may not be based on a matrix of pixels.

The light beam used for the light projection comprises light in a wavelength range that is required or suitable for hardening the light hardenable material, in the example a wavelength range of about 365 nm to about 470 nm or within a suitable ultraviolet wavelength range.

After hardening, the layer of hardened material is moved (pulled) away from the exposure plate 102 so as to create a new gap in which further light hardenable material flows, and so on.

In the example the hardenable material 105 is provided in a vat 104. The vat 104 is transparent so that light emitted from the light source passes through the exposure plate 102, through the vat 104 and finally reaches the hardenable material 105. The skilled person will recognize that the vat 104 is optional although it is of advantage, for example, for building up several objects from different materials without the need of cleaning the exposure plate 102 in between.

The physical object 10 is built up by providing (or "stacking") a multiplicity of layers in sequence. The dimension along which the layers are stacked is referred to as "build axis" (referred to as "Z" in the Figure). The build axis Z in the example further corresponds to a vertical dimension that is perpendicular to the first and second horizontal dimension X, Y. The build platform 101 is movable relative to the exposure plate 102 along the build axis Z. The build platform 101 has a build surface 101a that faces the exposure surface 102a. The device 100 is configured such that the build surface 101a and the exposure surface 102a can be positioned relative to each other by computer control. In particular, the distance between the build surface 101a and the exposure surface 102a relative to each other can be controlled by the computer. The build platform 101 (with the build surface 101a) is movable vertically, for example by means of a motor drivable linear guide. The build platform 101 may for example be mounted in a commercially available 3D printer that is based on stereolithography such as the Digital Light Projection™ (DLP) technique.

The layers typically have the same or a pre-determined uniform thickness (i.e. in the Z dimension) but can be individually two-dimensionally shaped in dimensions laterally to the thickness (i.e. in the first and second horizontal dimension X, Y) based on different light patterns. It is however possible to build up an object by providing a multiplicity of layers having different thicknesses. Therefore three-dimensional objects of a great variety of different shapes can be built up with this technique.

The accuracy of the object 10 along the build axis Z is generally determined by the precision at which the build surface 101a and the exposure surface 102a can be positioned relative to each other.

In one step of the method the object 10 is built up layer by layer along the build axis Z. For layerwise building up objects via additive manufacturing often one or more support structures are necessary or recommendable. These support structures typically provide support for so-called "overhanging" layers of the object, meaning layers of the object which in a dimension laterally of the build axis Z overhang one or more previously built up layers.

Typically, a layer that is built up can support a subsequent layer of the same size and shape or a layer which size and shape fits within the outline of the built up layer. A portion of a subsequent layer that laterally extends beyond the outline of the built up layer (virtually like a balcony) is however exposed to forces that may cause that portion to deform, depending on the latitude at which that portion overhangs the built up layer. Such forces in particular typically result from the force of gravity that typically acts in a dimension of the build axis. Further such forces may arise from pulling away a built up layer from the exposure plate 102 during repositioning of the build platform 101 for creating a new gap for a new layer. Therefore the latitude of an overhanging layer is limited and greater latitudes of overhanging layers typically require support structures. Accordingly in the step of the method the object 10 and at least one support structure 20 is built up layer by layer along the build axis A. In the example two support structures 20 are illustrated. In reality more than two support structures may be built up together with the object 10.

The support structure 20 supports the object on the build platform 101. Although it is illustrated that the support structures 20 directly support the object 10 on the build platform 101, in another example a baseplate (not shown) may be arranged directly on the build platform and the support structures may extend between the baseplate and the object.

Each support structure 20 connects to the object 10 from a direction laterally of the build axis Z. This is achieved in that a plurality of layers are provided which are each a common layer of the object 10 and the support structure 20. This means that the connection between the object 10 and the support structure 20 is only formed by common layers of the object 10 and the support structure 20.

Figure 2:
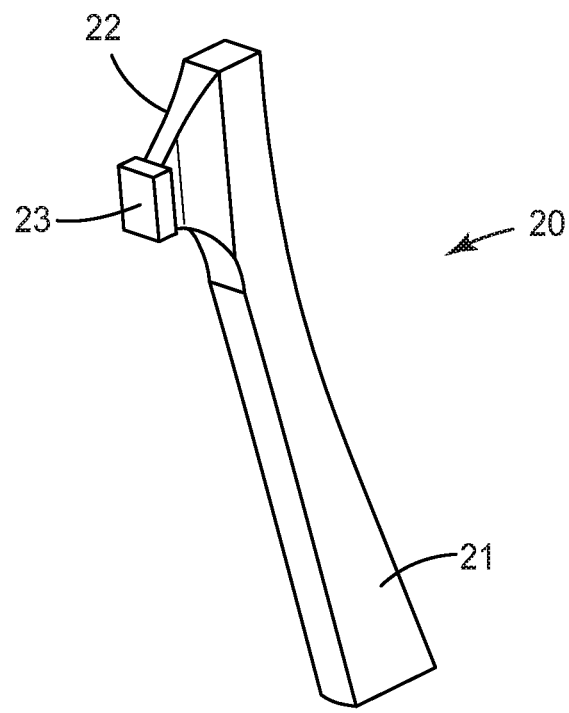
FIG. 2 is perspective view of a computer model of a support structure according to an embodiment of the invention.

FIG. 2 shows a virtual representation of the support structure 20 in more detail. The virtual support structure 20 has a base structure 21, a connecting structure 22 and a docking structure 23. The docking structure 23 is optional and provided for virtually merging with a virtual model of an object to be built up. Thus after merging, the docking structure forms part of the object so that the physical support structure does not have a docking structure. The virtual representation of the support structure 20 may be stored on a CAD (Computer Aided Design) system and may be duplicated multiple times for providing the virtual model of the object with multiple support structures. The virtual representation of the support structure 20 may further be stored in a database holding multiple differently shaped support structures in the form of virtual representations. During a design of an object including the support structures, each base structure 21 may be adapted to a desired in length. Therefore the virtual representation of the support structure 20 may have a base structure 21 exhibiting a standardized overlength which can be virtually shortened accordingly. Further during the design of the object and the support structures the docking structure 23 of each support structure 20 is merged into the object and thus forms part of the object. Therefore the virtual representation of the support structure 20 has a docking structure 23 that exhibits a standardized size and shape that merges into the virtual object. Hence the physical support structure 20 is based on a standardized virtual representation of which the free end portion of the base structure 21 is modified (shortened), and of which the docking structure 23 is merged into the object.

The physical support structure 20 (shown for example in FIG. 1) however corresponds to the virtual representation of the support structure 20 with respect to the connecting structure 22 and at least a portion of the base structure 21 adjacent the connecting structure 22. The connecting structure 22 tapers from the base structure 21 toward the docking structure 23. The connecting structure 22 therefore has a smallest cross-section at a transition between the connecting structure 22 and the object. The smallest cross-section forms a predetermined breaking zone A (illustrated in FIG. 3) at which the support structure 20 preferably separates from the object 10 if broken away.

Because the docking structure 23 has a planar surface directly adjacent the connecting structure 22, the physical object inherits that planar surface at an area directly adjacent the physical connecting structure 22. Due to the planar interface between the connecting structure 22 and the object, the smallest cross-section of the connecting structure 22 thus defines a separation plane at which the support structure 20 and the object separate with preference. The separation plane (the smallest cross-section) has a vertical size in a dimension of the build axis Z and a smaller horizontal size in a dimension perpendicular of the build axis Z. This provides for a robust support of the support structure 20 in the dimension along the build axis Z. This is because during building up the object any forces occur predominantly along the build axis Z, and the separation plane by the larger vertical size is configured to withstand those forces. On the other hand the smaller horizontal size of the separation plane allows for easy breaking away the support structure along a horizontal dimension.

Figure 3:
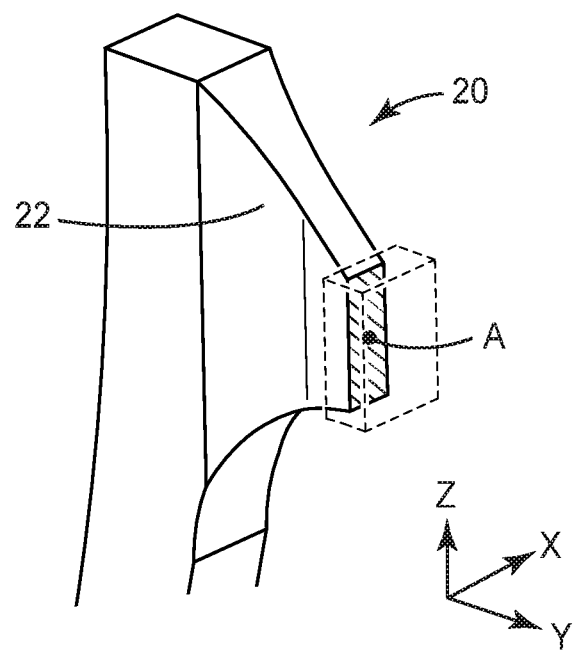
FIG. 3 is perspective view of a computer model of a portion of a support structure according to an embodiment of the invention.

FIG. 3 shows the support structure 20 with the predetermined breaking zone A defined by the smallest cross-section between the connecting structure 22 and the object (not illustrated). During building up the object each hardened layer generated on the exposure plate must be pulled away from the exposure plate for creating a new gap for creating new layer. The force needed to pull away the hardened layer (pull-away force) depends basically on the weight of the object and the support structures, on adhesion forces between the hardened layer and the exposure plate, and on fluid mechanics (in particular on forces to be applied for causing non-hardened light hardenable material to flow into the gap). Further forces may add during hardening the light hardenable material due to material shrinkage. These forces can be typically determined based on the light hardenable material used and the size and shape of the object and the support structures, so that the pull-away force can be determined too. In particular for the same hardenable material and the same device used, typically the pull-away force is proportional (or essentially proportional) to the number of pixels of the light pattern used to harden corresponding portions of a layer of light hardenable material. Accordingly the vertical size of the predetermined breaking zone A in the build axis Z can be designed based on the maximum pull-away force that occurs during building up the object and the support structures.

To enable easy breaking of the support structures from the object the predetermined breaking zone A is smaller in a dimension perpendicular to the build axis Z. In the example the smaller size of the predetermined breaking zone A is illustrated in the first dimension X. It has been found that due to the shape and size of the predetermined breaking zone A the support structure can be removed by pushing or pulling the object and the support structures relative to each other and exceeding the maximum pull-away force. For example once the object and the support structures are built up the object may be pushed onto the support structures so that the support structures break away from the object. Because each predetermined breaking zone A forms the weakest area, the support structures reproducibly break away from the object at the predetermined breaking zone A.

Figure 4:
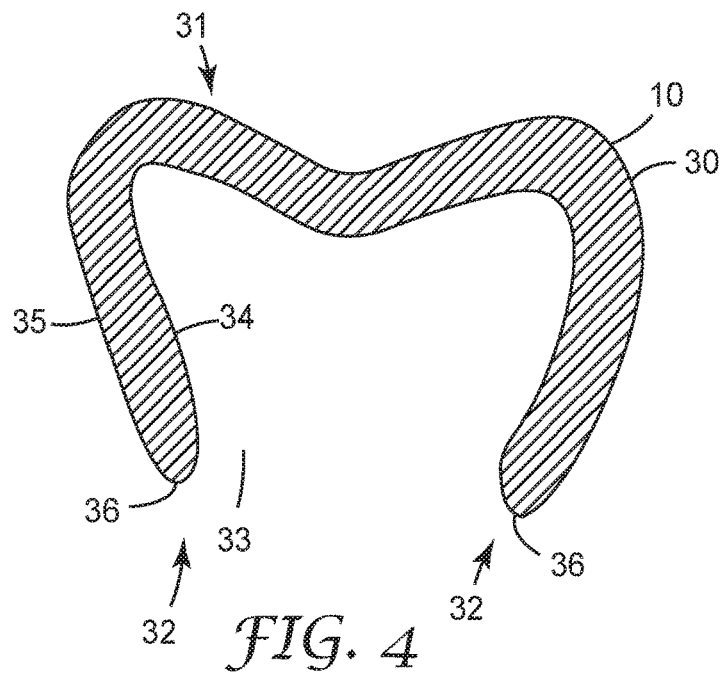
FIG. 4 is cross-sectional view of a dental coping as obtainable by the method according to an embodiment of the invention.

FIG. 4 shows the object 10 in the form of a dental coping 30, in particular a dental crown. The dental coping 30 has an occlusal end 31 and a margin end 32. The occlusal end 31 faces opposite teeth, when the coping is installed in a patient's mouth. Further, the margin end 32 faces a tooth stump restored by the dental coping 30, when the coping is installed in a patient's mouth. The dental coping has a cavity 33 that extends into the dental coping 30 from the margin end 32. The cavity 33 forms an inner surface 34 of the dental coping 30. An outer surface 35 of the dental coping is shaped to resemble the shape of a natural tooth. It is desired to finish particularly the outer surface 35 during building up the dental coping 30 by additive manufacturing. The method of the invention is particularly advantageous for the making of dental copings because the support structures can be arranged within the cavity 33 of the dental coping 30, as shown in FIG. 5.

Figure 5:
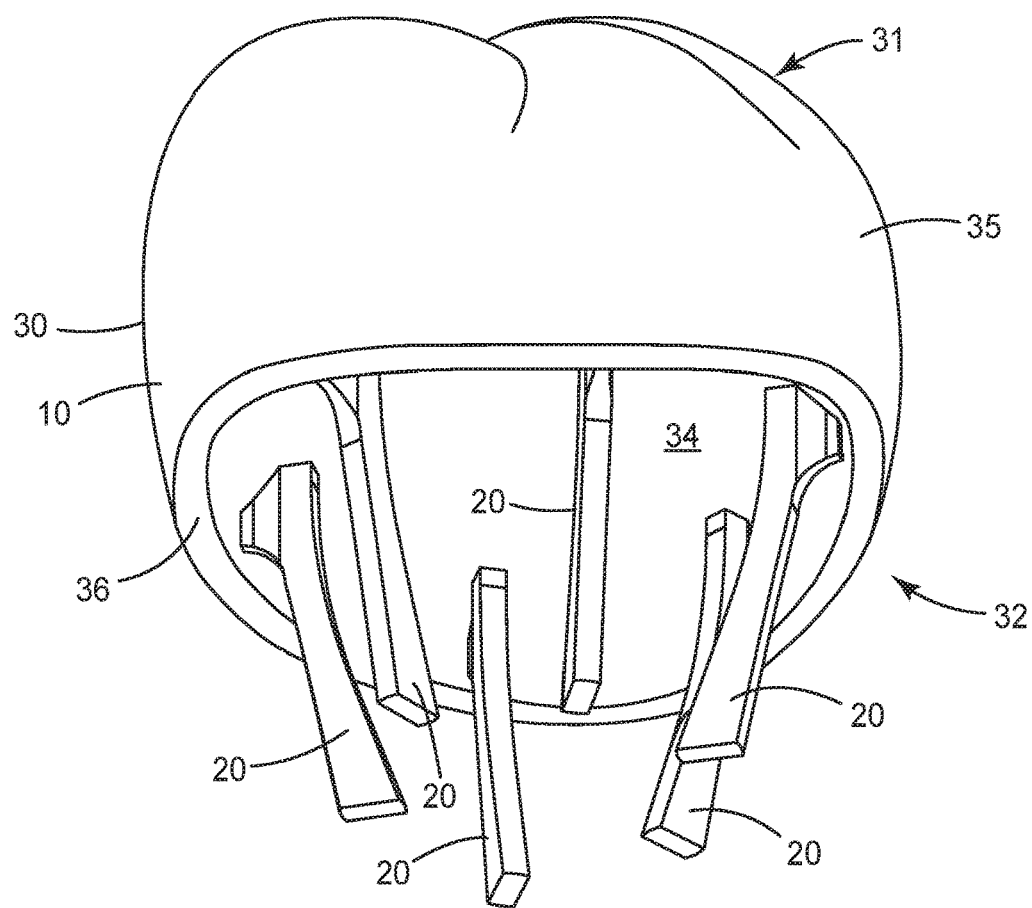
FIG. 5 is perspective view of a physical object in the form of a dental coping including support structures as obtainable by the method according to an embodiment of the invention.

FIG. 5 shows the dental coping 30 with the support structures 20 connecting to only the inner surface 34 of the dental coping 30. Accordingly the outer surface 35 is not affected by any connections to the support structures 20. Therefore any fraction surfaces resulting from breaking away the support structures may be only present within the inner surface 34. The limit between the inner and outer surface 34, 35 is a vertex 36 formed by the dental coping 30 at the margin end 32. Typically the outer surface 35 is visible after installation of the dental coping in a patient's mouth, whereas the inner surface 34 is not visible. Therefore also the fraction surfaces are hidden after installation of the dental coping in a patient's mouth. It has been further found that any residual docking portion 23' (resulting from the docking structure of the virtual support structure) may be used to provide a protruding retention structure within the inner surface 34 as shown in FIG. 6.

Figure 6:
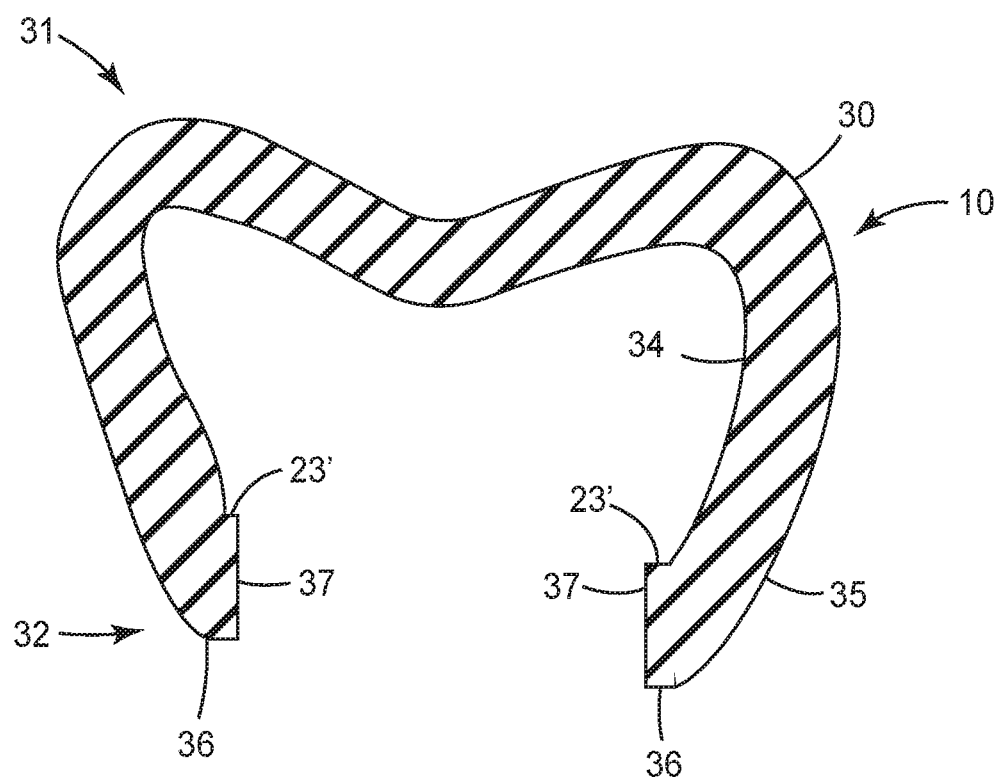
FIG. 6 is a cross-sectional view of a physical object in the form of a dental coping as obtainable by the method according to an embodiment of the invention.

As apparent from FIG. 6 the residual docking portions 23' further do not extend into the outer surface 35. The residual docking portions 23' protrude (partially) from the inner surface 34 and therefore form an undercut with respect to a dimension between the occlusal end 31 and the margin end 32. Therefore the residual docking portions 23' form a retention structure for retaining (for example cementing) the dental coping 30 on a tooth stump. Furthermore faction surfaces 37 resulting from breaking away the support structures provide for additional retention of the dental coping 30 on a tooth stump. This is because the fraction surface typically has a greater surface roughness than the inner surface of the dental coping 30.

What is claimed is:

1. A method of building up a physical object by additive manufacturing, the method comprising the steps of:
   building up the object and at least one support structure layer by layer along a build axis, wherein the support structure supports the object relative to a build platform,
   during building up of the object and the at least one support structure, providing a connection between the support structure and the object by a plurality of layers each of which being a common layer of the object and the support structure, and
   providing the connection between the support structure and the object with at least one void that is filled with non-hardened light hardenable material.

2. The method of claim 1, wherein a separation plane is defined adjacent a transition between the at least one support structure and the object, wherein the separation plane has a vertical size in a dimension of the build axis and a horizontal size in a dimension perpendicular of the build axis, and wherein the vertical size is greater than the horizontal size.

3. The method of claim 1, wherein the at least one support structure connects to the object from a direction laterally of the build axis.

4. The method of claim 1, wherein the at least one support structure forms a constriction which cross-section defines a separation plane.

5. The method of claim 4, wherein the constriction forms a predetermined break zone.

6. The method of claim 1, wherein the at least one support structure comprises a base structure and a connecting structure, and wherein the connecting structure connects the base structure and the object.

7. The method of claim 6, wherein the base structure extends parallel or essentially parallel to the build axis, and wherein the connecting structure extends perpendicular or essentially perpendicular to the build axis.

8. The method of claim 1, wherein the step of building up the object and the at least one support structure is based on successively performing the steps of:
   providing a layer of a light hardenable material; and
   exposing at least a portion of the layer with light appropriate to cause the light hardenable material to harden.

9. The method of claim 8, wherein the step of building up the object and the at least one support structure is based on applying an additive manufacturing process.

10. The method of claim 1, wherein the object is a dental coping having an occlusal end and a margin end, wherein a cavity extends into the dental coping from the margin end and forming an inner surface of the dental coping.

11. The method of claim 10, wherein the support structure extends from outside the cavity into the cavity and connects to the dental coping at the inner surface.

12. The method of claim 1, wherein the method further comprises creating the at least one void by providing a layer of hardenable material and hardening a layer that has a circumferential portion that surrounds a portion of the non-hardenable hardenable material.

13. The method of claim 12, wherein the at least one void is formed between two layers of hardened hardenable material.

14. The method of claim 1, wherein each common layer of object and at least one support structure comprises a plurality of voids arranged in a row.

15. The method of claim 1, wherein the method further comprises breaking the at least one support structure off from the object, wherein the voids are opened and non-hardened hardenable material is released.

16. The method of claim 1, wherein connection point between the at least one support structure and the object includes a plurality of voids filled with non-hardened hardenable material, wherein the voids are arranged in a determined pattern.

* * * * *